(12) United States Patent
Dai et al.

(10) Patent No.: US 10,476,372 B2
(45) Date of Patent: Nov. 12, 2019

(54) BUCK-BOOST POWER CONVERTER AND METHOD OF OPERATION THEREOF

(71) Applicant: Futurewei Technologies, Inc., Plano, TX (US)

(72) Inventors: Heping Dai, Plano, TX (US); Liming Ye, Frisco, TX (US); Jinbo Huang, Shenzhen (CN); Dianbo Fu, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 187 days.

(21) Appl. No.: 14/579,644

(22) Filed: Dec. 22, 2014

(65) Prior Publication Data

US 2016/0181920 A1 Jun. 23, 2016

(51) Int. Cl.
*H02M 3/158* (2006.01)
*H02M 1/14* (2006.01)
*H02M 1/44* (2007.01)
*H02M 1/00* (2006.01)

(52) U.S. Cl.
CPC ............ *H02M 1/14* (2013.01); *H02M 1/44* (2013.01); *H02M 3/1582* (2013.01); *H02M 2001/0054* (2013.01); *Y02B 70/1425* (2013.01); *Y02B 70/1491* (2013.01)

(58) Field of Classification Search
CPC ....... H02M 2003/1552; H02M 3/1582; H02M 3/1584; H02M 3/584; H02M 2003/1582; H02M 2003/1584; H02M 2001/1552
USPC .................... 323/271; 363/17, 126
See application file for complete search history.

(56) References Cited

U.S. PATENT DOCUMENTS

| | | | |
|---|---|---|---|
| 4,964,029 A | 10/1990 | Severinsky et al. | |
| 5,949,224 A | 9/1999 | Barkarö | |
| 6,037,755 A | 3/2000 | Mao et al. | |
| 6,166,527 A | 12/2000 | Dwelley et al. | |
| 6,348,781 B1 | 2/2002 | Midya et al. | |
| 7,176,667 B2 | 2/2007 | Chen et al. | |
| 7,518,346 B2 | 4/2009 | Prexl et al. | |
| 7,777,457 B2 | 8/2010 | Haiplik | |
| 8,446,133 B2* | 5/2013 | Kuan | H02M 3/1582 323/271 |
| 8,508,208 B2 | 8/2013 | Klein | |
| 2005/0093526 A1* | 5/2005 | Notman | H02M 3/1582 323/282 |
| 2011/0043172 A1* | 2/2011 | Dearn | H02M 3/1582 323/259 |
| 2013/0063982 A1* | 3/2013 | Ye | H02M 3/33592 363/17 |

(Continued)

*Primary Examiner* — Jeffrey A Gblende
*Assistant Examiner* — Lorena D Bruner
(74) *Attorney, Agent, or Firm* — Slater Matsil, LLP (57) ABSTRACT

A method comprises detecting an input voltage and an output voltage of a buck-boost converter, wherein the buck-boost converter comprises a first high-side switch and a first low-side switch connected in series across an input capacitor, a second high-side switch and a second low-side switch connected in series across an output capacitor and an inductor coupled between a common node of the first high-side switch and the first low-side switch, and a common node of the second high-side switch and the second low-side switch and configuring the buck-boost converter such that at least one of the first high-side switch and second low-side switch operates at a fixed duty cycle mode.

18 Claims, 7 Drawing Sheets

(56) References Cited

U.S. PATENT DOCUMENTS

| | | | |
|---|---|---|---|
| 2014/0084883 A1* | 3/2014 | Tanabe | H02M 3/1582 323/271 |
| 2014/0217996 A1* | 8/2014 | Peker | H02M 3/1582 323/271 |
| 2015/0263608 A1* | 9/2015 | Abe | H02M 3/1582 323/234 |

* cited by examiner

BUCK-BOOST POWER CONVERTER AND METHOD OF OPERATION THEREOF

TECHNICAL FIELD

The present invention relates to a dc/dc converter, and, in particular embodiments, to a control mechanism for buck-boost dc/dc converters.

BACKGROUND

A telecommunication network power system usually includes an AC-DC stage converting the power from the AC utility line to a 48 V DC distribution bus and a DC-DC stage converting the 48 V DC distribution bus to a plurality of voltage levels for all types of telecommunication loads. Both stages may comprise isolated DC-DC converters. Isolated DC-DC converters can be implemented by using different power topologies, such as flyback converters, forward converters, half bridge converters, full bridge converters, LLC resonant converters and the like.

As technologies further advance, bus converters have been widely employed in the telecommunication industry. The bus voltages may be divided into three categories, a 12 V bus voltage converted from a 48 V input dc power supply, a 48 V bus voltage converted from a 380 V input dc power supply and a 12 V bus voltage converted from a 380 V input dc power supply. A bus converter not only converts the input voltage from a higher level to a lower level, but also provides isolation through a magnetic device such as transformers and/or the like.

The intermediate bus voltage such as 12 V may function as an input power bus for a plurality of downstream non-isolated power converters. The downstream non-isolated power converters may be implemented as step-down dc/dc converter converters such as buck converters, step-up dc/dc converter converters such as boost converters, linear regulators, any combinations thereof. The downstream non-isolated power converters operate under a tight control loop so that fully regulated output voltages are fed into their respective loads.

SUMMARY OF THE INVENTION

These and other problems are generally solved or circumvented, and technical advantages are generally achieved, by embodiments of the present invention which provide a method for achieving a high efficiency non-isolated power converter.

In accordance with an embodiment, a method comprises detecting an input voltage and an output voltage of a buck-boost converter, wherein the buck-boost converter comprises a first high-side switch and a first low-side switch connected in series across an input capacitor, a second high-side switch and a second low-side switch connected in series across an output capacitor and an inductor coupled between a common node of the first high-side switch and the first low-side switch, and a common node of the second high-side switch and the second low-side switch.

The method further comprises configuring the buck-boost converter such that at least one of the first high-side switch and second low-side switch operates at a fixed duty cycle mode.

In accordance with another embodiment, a method comprises providing a power converter, wherein the power converter comprises a buck converter portion comprising a first high-side switch and a first low-side switch connected in series across an input capacitor, a boost converter portion comprising a second high-side switch and a second low-side switch connected in series across an output capacitor and an inductor coupled between a common node of the first high-side switch and the first low-side switch, and a common node of the second high-side switch and the second low-side switch.

The method further comprises detecting an input voltage and an output voltage of the power converter and configuring the power converter such that at least one portion of the power converter operates at a fixed duty cycle mode.

In accordance with yet another embodiment, a converter comprises a buck converter portion comprising a first high-side switch and a first low-side switch connected in series across an input capacitor, a boost converter portion comprising a second high-side switch and a second low-side switch connected in series across an output capacitor and an inductor coupled between the buck converter portion and the boost converter portion, wherein the buck converter portion, the boost converter portion are configured such that at least one of the first high-side switch and the second low-side switch operates at a fixed duty cycle mode.

An advantage of an embodiment of the present invention is the efficiency of a buck-boost dc/dc converter may be improved by employing multiple operation modes. In addition, seamlessly transitions between different operation modes help to reduce the control complexity of the buck-boost dc/dc converter and minimize the output voltage transients during transitions between different operation modes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the present embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in a specific context, namely control methods for a high efficiency buck-boost dc/dc converter. Hereinafter, various embodiments will be explained in detail with reference to the accompanying drawings.

Figure 1:
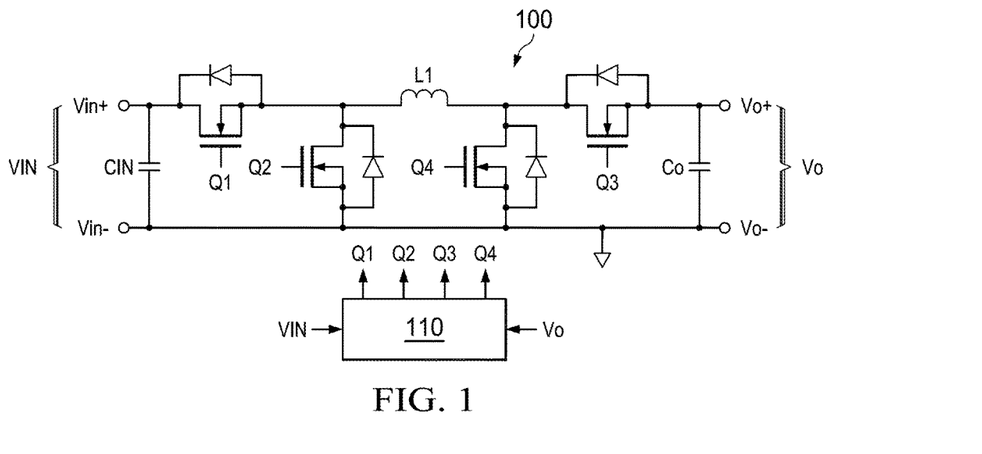
FIG. 1 illustrates a schematic diagram of a buck-boost dc/dc converter in accordance with various embodiments of the present disclosure.

FIG. 1 illustrates a schematic diagram of a buck-boost dc/dc converter in accordance with various embodiments of the present disclosure. The buck-boost dc/dc converter 100 comprises a first high-side switch Q1, a first low-side switch Q2, a second high-side switch Q3, a second low-side switch Q4 and an inductor L1. The first high-side switch Q1 and the first low-side switch Q2 are connected in series between the positive terminal and the negative terminal of an input capacitor CIN. The second high-side switch Q3 and the second low-side switch Q4 are connected in series between the positive terminal and the negative terminal of an output capacitor Co. The inductor L1 is coupled between the common node of the first high-side switch Q1 and the first low-side switch Q2, and the common node of the second high-side switch Q3 and the second low-side switch Q4.

The buck-boost dc/dc converter 100 may further comprise a controller 110. As shown in FIG. 1, the controller 110 may detect the input voltage VIN and the output voltage Vo, and generate a plurality of gate drive signals for driving switches Q1, Q2, Q3 and Q4 accordingly. The controller 110 may be a PWM controller. Alternatively, the controller 110 may be implemented as a digital controller such as a micro-controller, a digital signal processor and/or the like.

It should be noted that while the example throughout the description is based upon a buck-boost converter and a controller configured to generate gate drive signal for the buck-boost converter (e.g., buck-boost converter shown in FIG. 1), the buck-boost converter 100 as well as the controller 110 shown in FIG. 1 may have many variations, alternatives, and modifications. For example, the controller 110 may detect other necessary signals such as the input and/or output current of the buck-boost converter 100. Furthermore, there may be one dedicated driver or multiple dedicated drivers coupled between the controller 110 and the switches Q1, Q2, Q3 and Q4. In sum, the buck-boost dc/dc converter and the controller illustrated herein is limited solely for the purpose of clearly illustrating the inventive aspects of the various embodiments. The present invention is not limited to any particular power topology.

In some embodiments, the buck-boost dc/dc converter 100 may comprise two portions, namely a buck converter portion and a boost converter portion. The buck converter portion may comprise the first high-side switch Q1 and the first low-side switch Q2. The buck converter portion and the inductor L1 may function as a step-down converter. On the other hand, the boost converter portion may comprise the second high-side switch Q3 and second low-side switch Q4. The boost converter portion and the inductor L1 may function as a step-up converter. The buck converter portion, the inductor L1 and the boost converter portion are connected in cascade between the input capacitor CIN and the output capacitor Co.

The switches (e.g., the first high-side switch Q1) shown in FIG. 1 may be implemented as n-type metal oxide semiconductor (NMOS) transistors. Alternatively, the switches may be implemented as other suitable controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should further be noted that while FIG. 1 illustrates four switches Q1, Q2, Q3, and Q4, various embodiments of the present disclosure may include other variations, modifications and alternatives. For example, the low-side switch Q2 may be replaced by a freewheeling diode and/or the like. The high-side switch Q3 may be replaced by a dc blocking diode and/or the like.

Depending on different operation modes, the buck-boost dc/dc converter 100 may comprise at least three control mechanisms. In a first control mechanism, depending on different input voltages, the buck converter portion may be partially active and the boost converter portion is fully active. The detailed operating principle of the first control mechanism will be described below with respect to FIGS. 2-6. In a second control mechanism, the buck converter portion is fully active and the boost converter portion is partially active. The detailed operating principle of the second control mechanism will be described below with respect to FIGS. 7-11. In a third control mechanism, both the buck converter portion and the boost converter portion are fully active. The detailed operating principle of the third control mechanism will be described below with respect to FIGS. 12-13.

Figure 2:
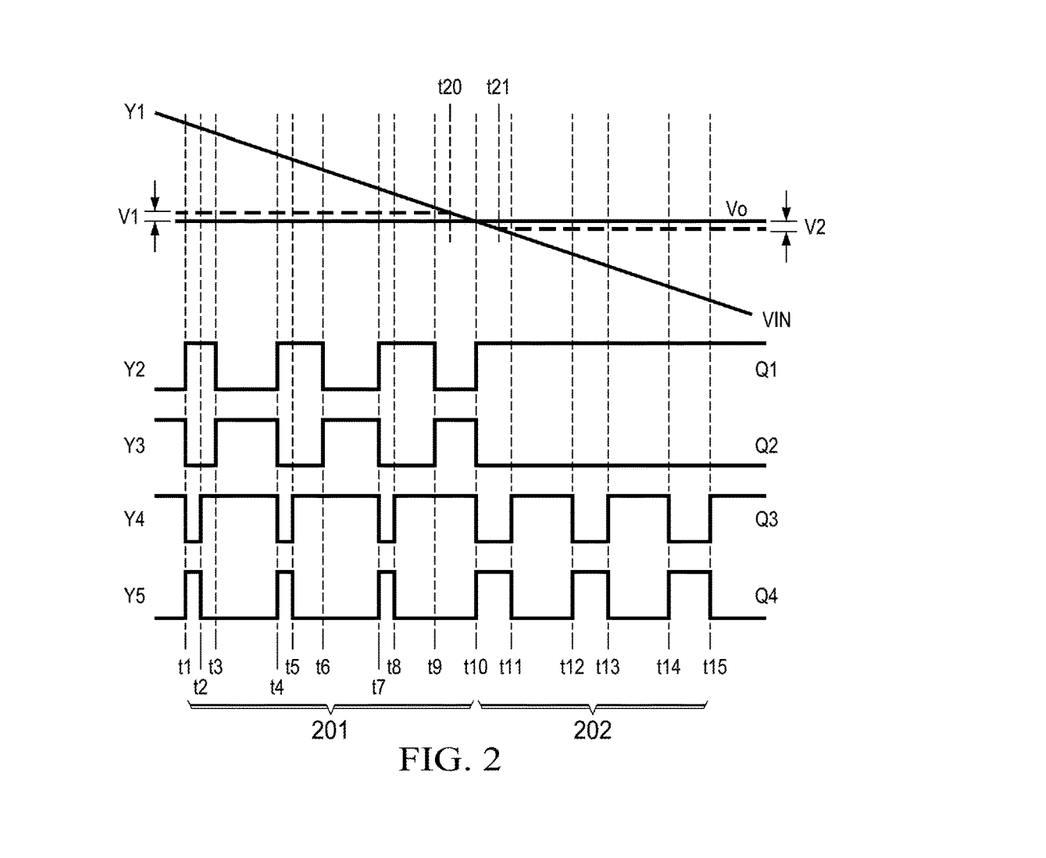
FIG. 2 illustrates a first timing diagram of the first control mechanism in accordance with various embodiments of the present disclosure.

FIG. 2 illustrates a first timing diagram of the first control mechanism in accordance with various embodiments of the present disclosure. The horizontal axis of FIG. 2 represents intervals of time. There may be five vertical axes. The first vertical axis Y1 represents the input voltage and the output voltage of the buck-boost dc/dc converter 100 shown in FIG. 1. The second vertical axis Y2 represents the gate drive signal of the first high-side switch Q1. The third vertical axis Y3 represents the gate drive signal of the first low-side switch Q2. The fourth vertical axis Y4 represents the gate drive signal of the second high-side switch Q3. The fifth vertical axis Y5 represents the gate drive signal of the second low-side switch Q4.

As shown in FIG. 2, depending on different input voltages, two operation modes may be employed by the buck-boost dc/dc converter 100. More particularly, during a first operation mode 201, when the input voltage VIN is greater than the output voltage Vo, the first high-side switch Q1 operates a PWM mode. In other words, the duty cycle of the first high-side switch Q1 is determined by a feedback loop (not shown). In response to the input voltage VIN, the feedback loop determines an appropriate duty cycle for the first high-side switch Q1 so that the output voltage Vo is tightly regulated. As shown in FIG. 2, the turn-on time (e.g., time interval between t1 and t3, time interval between t4 and t6 and time interval between t7 and t9) of the first high-side switch Q1 increases gradually in response to the drop of the input voltage VIN. The PWM control mechanism of a power converter is well known, and hence is not discussed in further detail to avoid unnecessary repetition.

In some embodiments, the gate drive signal of the first low-side switch Q2 is complementary to the gate drive signal of the first high-side switch Q1. In the first operation mode 201, the second low-side switch Q4 may operate at a fixed duty cycle mode. In some embodiments, the duty cycle (e.g., time interval between t1 and t2, time interval between t4 and t5 and time interval between t7 and t8) of the second low-side switch Q4 is approximately equal to the minimum pulse generated by the controller 110. In some embodiments, the minimum pulse is approximately equal to 50 ns. In the first operation mode 201, the gate drive signal of the second high-side switch Q3 is complementary to the gate drive signal of the second low-side switch Q4.

In the second operation mode 202, the first high-side switch Q1 enters an always-on mode. The gate drive signal of the first low-side switch Q2 is complementary to the gate drive signal of the first high-side switch Q1. As shown in FIG. 2, the first low-side switch Q2 is turned off during the second operation mode 202. The second low-side switch Q4 and the second high-side switch Q3 enter a PWM mode. In response to the voltage drop from t10 to t15, the duty cycle (e.g., time interval between t10 and t11, time interval between t12 and t13 and time interval between t14 and t15) of the second low-side switch Q4 may increase gradually as shown in FIG. 2.

It should be noted the timing diagram shown in FIG. 2 is merely an example, which should not unduly limit the scope of the claims. One of ordinary skill in the art would recognize many variations, alternatives, and modifications. For example, there may be a dead time between two complementary gate drive signals described above. Furthermore, there may be a third operation mode between the first operation mode 201 and the second operation mode 202. More particularly, the boost converter portion of the buck-boost dc/dc converter 100 may not leave the fixed duty operation mode and enter the PWM mode at time t10 where the input voltage is approximately equal to the output voltage. Instead, the boost converter portion of the buck-boost dc/dc converter 100 may enter the PWM mode at t20 where the input voltage is slightly greater than the output voltage.

At t20, VIN=Vo+V1, where V1 is a predetermined value. Similarly, the buck converter portion of the buck-boost dc/dc converter 100 may not leave the PWM mode and enter the always-on mode at time t10 where the input voltage is approximately equal to the output voltage. Instead, the buck converter portion of the buck-boost dc/dc converter 100 may enter the always-on mode at t21 where the input voltage is slightly less than the output voltage. At t21, VIN=Vo−V2, where V2 is a predetermined value.

Figure 3:
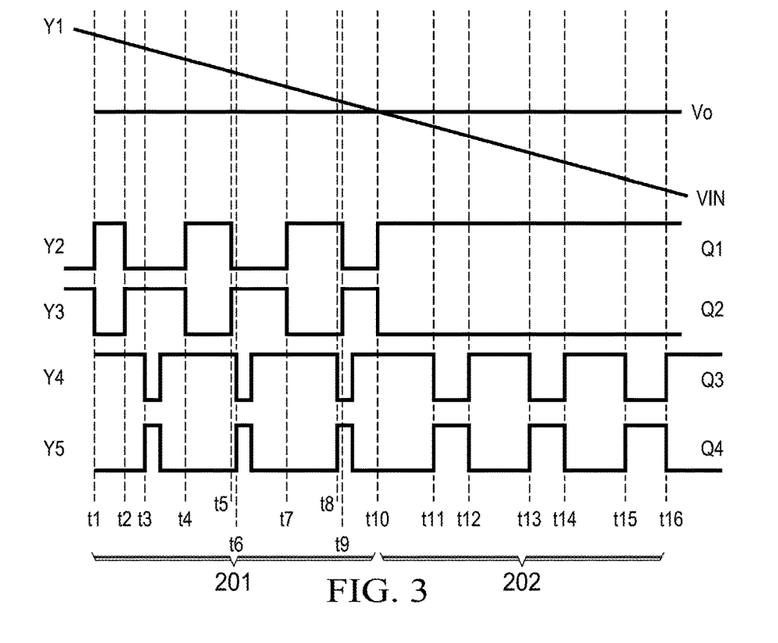
FIG. 3 illustrates a second timing diagram of the first control mechanism in accordance with various embodiments of the present disclosure.

FIG. 3 illustrates a second timing diagram of the first control mechanism in accordance with various embodiments of the present disclosure. The timing diagram shown in FIG. 3 is similar to that shown in FIG. 2 except that the gate drive signals of the first high-side switch Q1 and the second low-side switch Q4 are out-of-phase signals when the input voltage VIN is greater than the sum of the output voltage Vo and V1. In some embodiments, the phase shift between the gate drive signals of the first high-side switch Q1 and the second low-side switch Q4 is about 180 degrees as shown in FIG. 3. It should be noted that the 180-degree phase shift (e.g., phase shift from t1 to t2 shown in FIG. 3) is merely an example. A person skilled in the art will recognize that other suitable phase shifts such as a 90-degree phase shift and/or the like may be alternatively employed.

One advantageous feature of having the out-of-phase operation shown in FIG. 3 is that the out-of-phase operation helps to reduce the ripple current of the buck-boost dc/dc converter 100, thereby reducing the required capacitance of the input filter and/or the output filter.

Figure 4:
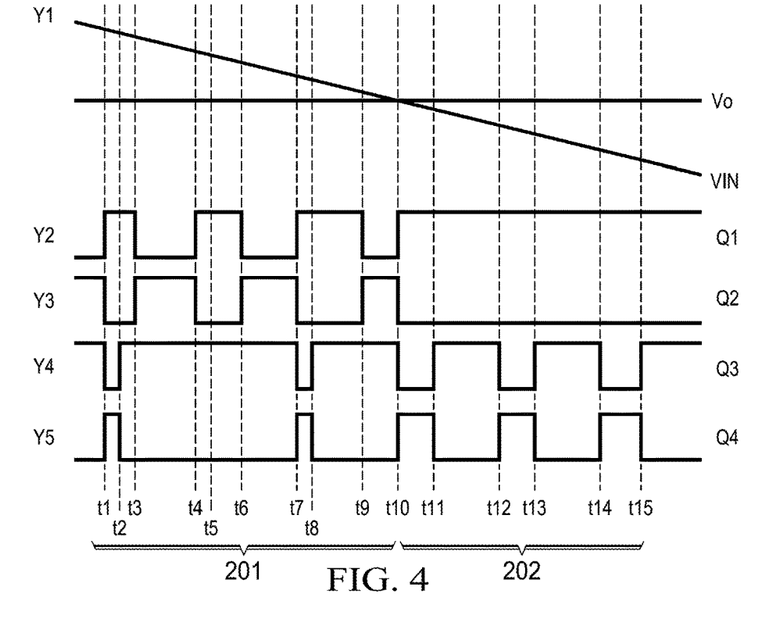
FIG. 4 illustrates a third timing diagram of the first control mechanism in accordance with various embodiments of the present disclosure.
Figure 5:
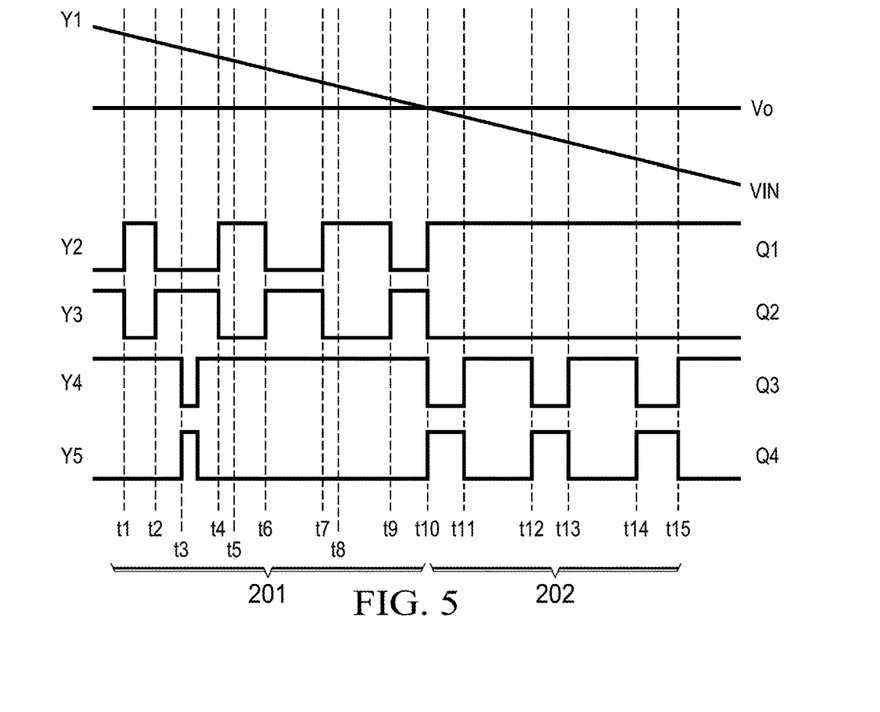
FIG. 5 illustrates a fourth timing diagram of the first control mechanism in accordance with various embodiments of the present disclosure.

FIG. 4 illustrates a third timing diagram of the first control mechanism in accordance with various embodiments of the present disclosure. The timing diagram shown in FIG. 4 is similar to that shown in FIG. 2 except that the second low-side switch Q4 operates at a fixed duty cycle and a reduced switching frequency when the input voltage VIN is greater than the sum of the output voltage Vo and V1. In some embodiments, the switching frequency of the second low-side switch Q4 is about 50% of the switching frequency of the first high-side switch Q1 as shown in FIG. 4. It should be noted that the switching frequency of the second low-side switch Q4 in the first operation mode 201 shown in FIG. 5 is merely an example. A person skilled in the art will recognize that other suitable switching frequencies may be alternatively employed.

One advantageous feature of having a reduced switching frequency shown in FIG. 4 is that the reduced switching frequency of the second low-side switch Q4 helps to reduce the switching losses of the buck-boost dc/dc converter 100, thereby improving the efficiency of the buck-boost dc/dc converter 100.

FIG. 5 illustrates a fourth timing diagram of the first control mechanism in accordance with various embodiments of the present disclosure. The timing diagram shown in FIG. 5 is similar to that shown in FIG. 2 except that gate drive signal of the second low-side switch Q4 is not sync with the gate drive signal of the first high-side switch Q1 when the input voltage VIN is greater than the sum of the output voltage Vo and V1. Instead, the turn-on instance of the second low-side switch Q4 is randomly selected with reference to the turn-on instance of the first high-side switch Q1. In some embodiments, the turn-on instance of the second low-side switch Q4 is selected by a digital controller such that the switching noise of the buck-boost dc/dc converter 100 is dispersed over a wide range.

One advantageous feature of having a random turn-on instance shown in FIG. 5 is that randomly varying the turn-on instance of the second low-side switch Q4 helps to reduce the electromagnetic interference (EMI) of the buck-boost dc/dc converter 100.

Figure 6:
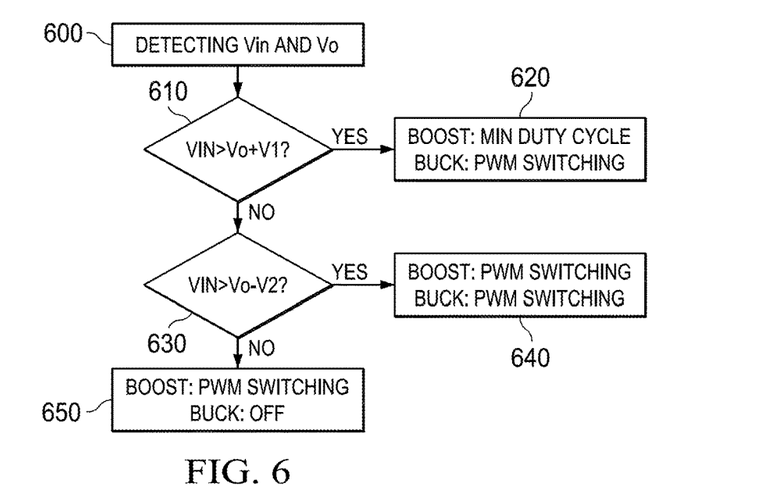
FIG. 6 illustrates a flow chart of a first method for configuring the buck-boost converter shown in FIG. 1 in accordance with various embodiments of the present disclosure.

FIG. 6 illustrates a flow chart of a first method for configuring the buck-boost converter shown in FIG. 1 in accordance with various embodiments of the present disclosure. This flowchart is merely an example, which should not unduly limit the scope of the claims. One of ordinary skill in the art would recognize many variations, alternatives, and modifications. For example, various step as illustrated in FIG. 6 may added, removed, replaced, rearranged and repeated.

At step 600, the controller 110 shown in FIG. 1 detects the input voltage VIN and the output voltage Vo. At step 610, if the input voltage VIN is greater than the sum of the output voltage Vo and a first predetermined threshold V1, then step 620 is executed wherein the boost converter portion of the buck-boost dc/dc converter 100 operates at a minimum duty cycle mode and the buck converter portion of the buck-boost dc/dc converter 100 operates at a PWM mode. In some embodiments, the first predetermined threshold V1 is approximately equal to 3 V when the input voltage VIN is about 48 V.

On the other hand, if the input voltage VIN is not greater than the sum of the output voltage Vo and the first predetermined threshold V1, step 630 is executed as shown in FIG. 6. At step 630, if the input voltage VIN is greater than the output voltage Vo minus a second predetermined threshold V2, then step 640 is executed wherein both the boost converter portion and the buck converter portion operate at a PWM mode. On the other hand, step 650 is executed wherein the boost converter portion operates at the PWM mode and the high-side switch of the buck converter portion enters an always-on mode. In some embodiments, the second predetermined threshold V2 is approximately equal to 3 V when the input voltage VIN is about 48 V.

Figure 7:
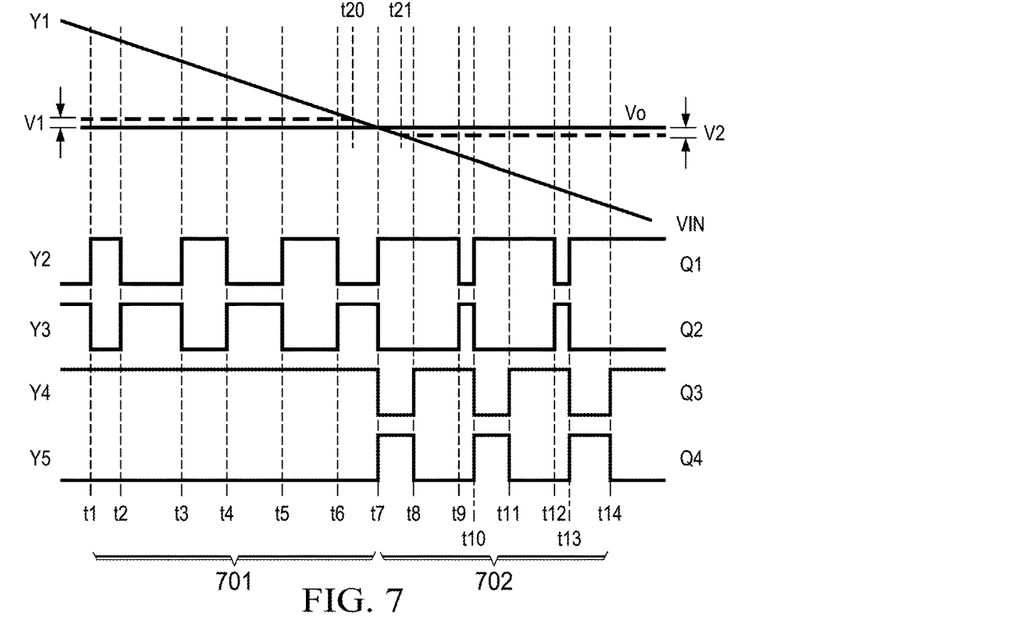
FIG. 7 illustrates a first timing diagram of the second control mechanism in accordance with various embodiments of the present disclosure.

FIG. 7 illustrates a first timing diagram of the second control mechanism in accordance with various embodiments of the present disclosure. As shown in FIG. 7, depending on different input voltages, two operation modes may be employed by the buck-boost dc/dc converter 100. During a first operation mode 701, when the input voltage VIN is greater than the output voltage Vo, the first high-side switch Q1 operates a PWM mode. The gate drive signal of the first low-side switch Q2 is complementary to the gate drive signal of the first high-side switch Q1. In the first operation mode 201, the second low-side switch Q4 may operate at an always-off mode. The gate drive signal of the second high-side switch Q3 is complementary to the gate drive signal of the second low-side switch Q4.

In the second operation mode 702, the first high-side switch Q1 operates at a fixed duty cycle mode. In some embodiments, the duty cycle of the first high-side switch Q1 is approximately equal to the maximum pulse generated by the controller 110. In some embodiments, the maximum pulse generated by the controller 110 is approximately equal to the switching period of the buck-boost dc/dc converter minus 50 ns.

It should be noted the timing diagram shown in FIG. 7 is merely an example, which should not unduly limit the scope of the claims. One of ordinary skill in the art would recognize many variations, alternatives, and modifications. For example, the boost converter portion of the buck-boost dc/dc converter 100 may not leave the always-on mode and enter the PWM mode at time t7 where the input voltage is approximately equal to the output voltage. Instead, the boost converter portion of the buck-boost dc/dc converter 100 may enter the PWM mode at t20 where the input voltage is slightly greater than the output voltage. At t20, VIN=Vo+V1, where V1 is a predetermined value. Similarly, the buck converter portion of the buck-boost dc/dc converter 100 may not leave the PWM mode and enter the fixed duty cycle mode at time t7 where the input voltage is approximately equal to the output voltage. Instead, the buck converter portion of the buck-boost dc/dc converter 100 may enter the fixed duty cycle mode at t21 where the input voltage is slightly less than the output voltage. At t21, VIN=Vo−V2, where V2 is a predetermined value.

Figure 8:
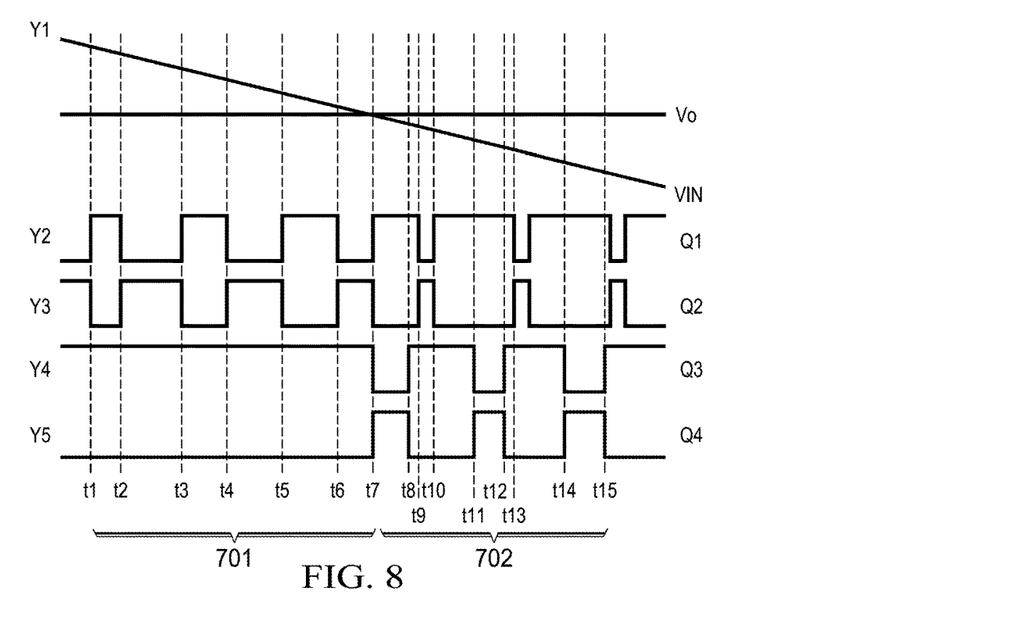
FIG. 8 illustrates a second timing diagram of the second control mechanism in accordance with various embodiments of the present disclosure.

FIG. 8 illustrates a second timing diagram of the second control mechanism in accordance with various embodiments of the present disclosure. The timing diagram shown in FIG. 8 is similar to that shown in FIG. 7 except that the gate drive signals of the first high-side switch Q1 and the second low-side switch Q4 are out-of-phase signals when the input voltage VIN is less than the output voltage Vo minus V2. In some embodiments, the gate drive signals of the first high-side switch Q1 and the second low-side switch Q4 are with 180-degree out-of-phase operation as shown in FIG. 8. One advantageous feature of having the out-of-phase operation shown in FIG. 8 is that the out-of-phase operation helps to reduce the ripple current of the buck-boost dc/dc converter 100, thereby reducing the required capacitance of the input filter and/or the output filter.

Figure 9:
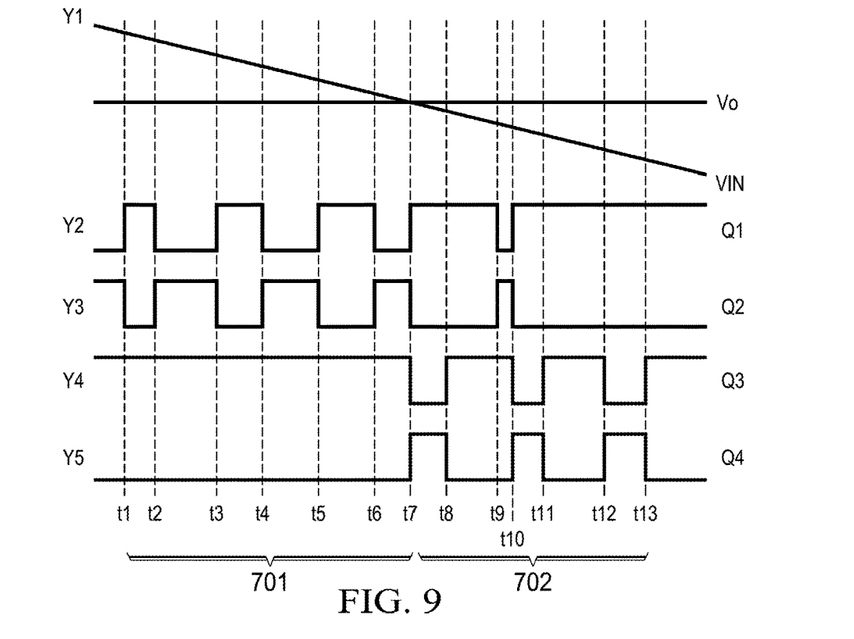
FIG. 9 illustrates a third timing diagram of the second control mechanism in accordance with various embodiments of the present disclosure.

FIG. 9 illustrates a third timing diagram of the second control mechanism in accordance with various embodiments of the present disclosure. The timing diagram shown in FIG. 9 is similar to that shown in FIG. 7 except that the first high-side switch Q1 operates at a fixed duty cycle and a reduced switching frequency when the input voltage VIN is less than the output voltage Vo minus V2. One advantageous feature of having a reduced switching frequency shown in FIG. 9 is that the reduced switching frequency of the first high-side switch Q1 helps to reduce the switching losses of the buck-boost dc/dc converter 100, thereby improving the efficiency of the buck-boost dc/dc converter 100.

Figure 10:
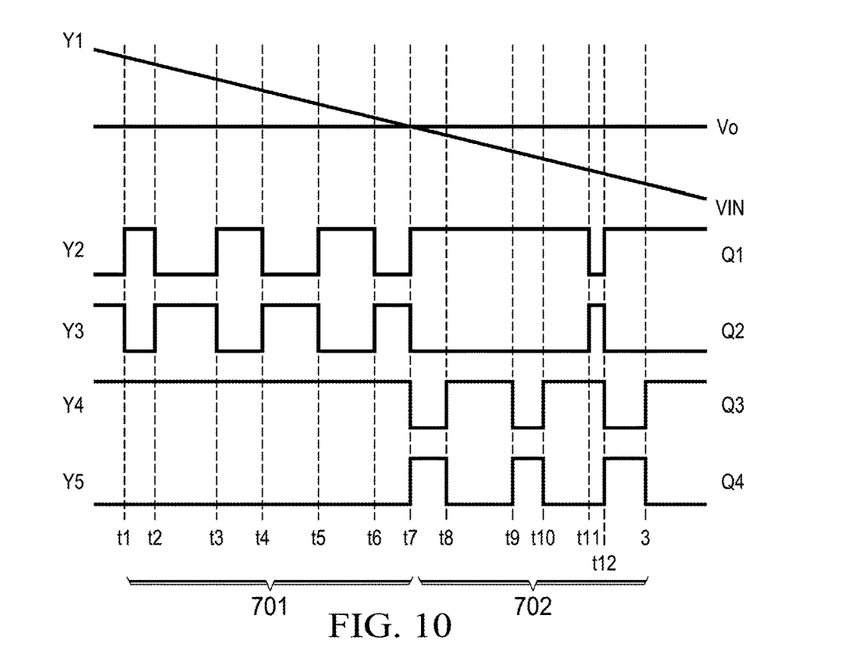
FIG. 10 illustrates a fourth timing diagram of the second control mechanism in accordance with various embodiments of the present disclosure.

FIG. 10 illustrates a fourth timing diagram of the second control mechanism in accordance with various embodiments of the present disclosure. The timing diagram shown in FIG. 10 is similar to that shown in FIG. 7 except that the turn-on instance of the first high-side switch Q1 is randomly selected with reference to the turn-on instance of the second low-side switch Q4 when the input voltage VIN is less than the output voltage Vo minus V2. One advantageous feature of having a random turn-on instance shown in FIG. 10 is that randomly varying the turn-on instance of the first high-side switch Q1 helps to reduce the electromagnetic interference (EMI) of the buck-boost dc/dc converter 100.

Figure 11:
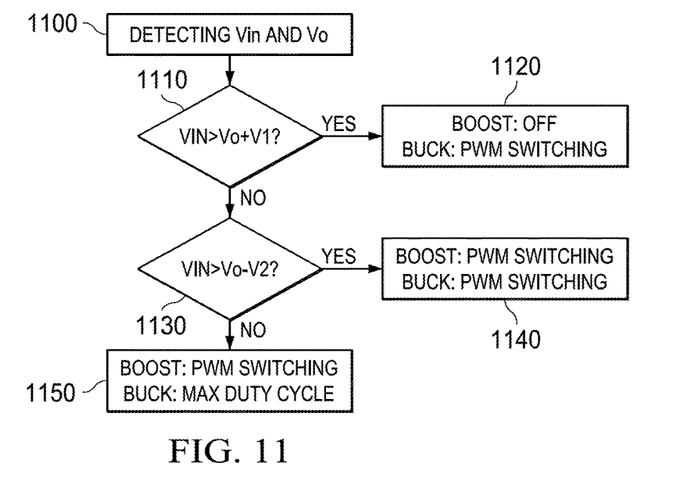
FIG. 11 illustrates a flow chart of a second method for configuring the buck-boost converter shown in FIG. 1 in accordance with various embodiments of the present disclosure.

FIG. 11 illustrates a flow chart of a second method for configuring the buck-boost converter shown in FIG. 1 in accordance with various embodiments of the present disclosure. At step 1100, the controller 110 shown in FIG. 1 detects the input voltage VIN and the output voltage Vo. At step 1110, if the input voltage VIN is greater than the sum of the output voltage Vo and a first predetermined threshold V1, then step 1120 is executed wherein the high-side switch of the boost converter portion enters an always-on mode and the buck converter portion of the buck-boost dc/dc converter 100 operates at a PWM mode. In some embodiments, the first predetermined threshold V1 is approximately equal to 3 V when the input voltage VIN is about 48 V.

On the other hand, if the input voltage VIN is not greater than the sum of the output voltage Vo and the first predetermined threshold V1, step 1130 is executed as shown in FIG. 11. At step 1130, if the input voltage VIN is greater than the output voltage Vo minus a second predetermined threshold V2, then step 1140 is executed wherein both the boost converter portion and the buck converter portion operate at a PWM mode. On the other hand, step 1150 is executed wherein the boost converter portion operates at the PWM mode and the high-side switch of the buck converter portion enters a maximum duty cycle mode. In some embodiments, the second predetermined threshold V2 is approximately equal to 3 V when the input voltage VIN is about 48 V.

Figure 12:
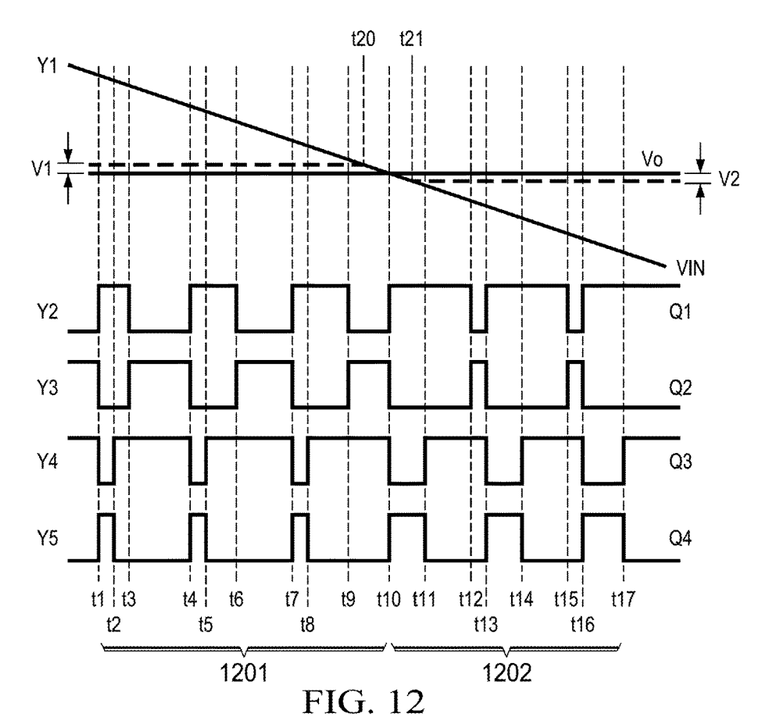
FIG. 12 illustrates a timing diagram of the third control mechanism in accordance with various embodiments of the present disclosure.

FIG. 12 illustrates a timing diagram of the third control mechanism in accordance with various embodiments of the present disclosure. As shown in FIG. 12, depending on different input voltages, two operation modes may be employed by the buck-boost dc/dc converter 100. During a first operation mode 1201, the operation of the buck-boost dc/dc converter 100 shown in FIG. 12 is similar to the operation of the buck-boost dc/dc converter 100 shown in FIG. 2, and hence is not discussed in further detail herein.

During a second operation mode 1202, the operation of the buck-boost dc/dc converter 100 shown in FIG. 12 is similar to the operation of the buck-boost dc/dc converter 100 shown in FIG. 7, and hence is not discussed in further detail herein.

In sum, in the first operation mode 1201, the buck converter portion of the buck-boost dc/dc converter 100 operates at a PWM mode and the boost converter portion of the buck-boost dc/dc converter 100 operates at a minimum duty cycle mode. Likewise, in the second operation mode 1202, the buck converter portion of the buck-boost dc/dc converter 100 operates at a maximum duty cycle mode and the boost converter portion of the buck-boost dc/dc converter 100 operates at a PWM mode.

It should be noted the timing diagram shown in FIG. 12 is merely an example, which should not unduly limit the scope of the claims. One of ordinary skill in the art would recognize many variations, alternatives, and modifications. For example, the phase-shift control mechanisms shown in FIG. 3 and FIG. 8 are applicable to the control method shown in FIG. 12. Furthermore, the control mechanisms shown in FIGS. 4-5 and 9-10 may be applicable to the control method shown in FIG. 12.

Figure 13:
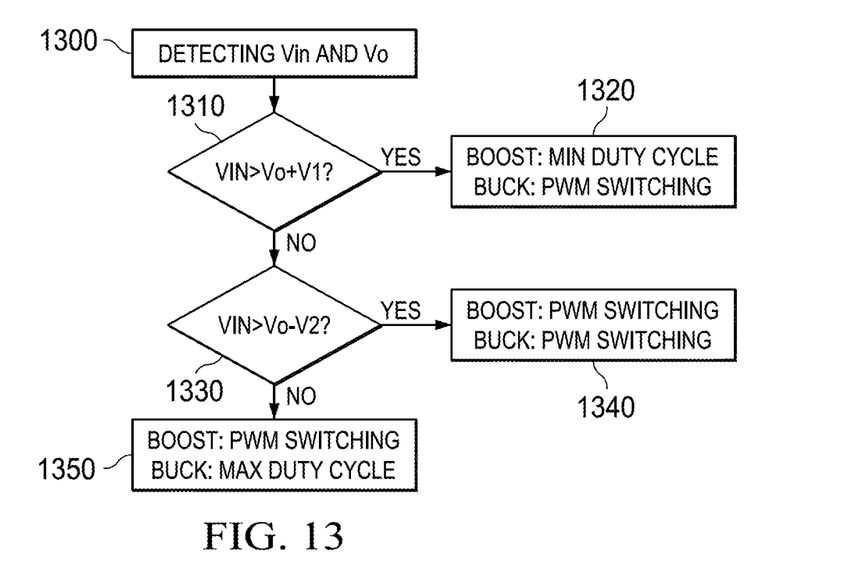
FIG. 13 illustrates a flow chart of a third method for configuring the buck-boost converter shown in FIG. 1 in accordance with various embodiments of the present disclosure.

FIG. 13 illustrates a flow chart of a third method for configuring the buck-boost converter shown in FIG. 1 in accordance with various embodiments of the present disclosure. At step 1300, the controller 110 shown in FIG. 1 detects the input voltage VIN and the output voltage Vo. At step 1310, if the input voltage VIN is greater than the sum of the output voltage Vo and a first predetermined threshold V1, then step 1120 is executed wherein the boost converter portion enters a minimum duty cycle mode and the buck converter portion of the buck-boost dc/dc converter 100 operates at a PWM mode. In some embodiments, the first predetermined threshold V1 is approximately equal to 3 V when the input voltage VIN is about 48 V.

On the other hand, if the input voltage VIN is not greater than the sum of the output voltage Vo and the first predetermined threshold V1, step 1330 is executed as shown in FIG. 13. At step 1130, if the input voltage VIN is greater than the output voltage Vo minus a second predetermined threshold V2, then step 1340 is executed wherein both the boost converter portion and the buck converter portion operate at a PWM mode. On the other hand, step 1350 is executed wherein the boost converter portion operates at the PWM mode and the buck converter portion enters a maximum duty cycle mode. In some embodiments, the second predetermined threshold V2 is approximately equal to 3 V when the input voltage VIN is about 48 V.

Referring back to FIG. 1, the control mechanisms shown in FIG. 6, FIG. 11 and FIG. 13 may be employed to generate gate drive signals of the buck-boost dc/dc converter 100. The control mechanism shown in FIG. 6 may provide better efficiency when the primary application of the buck-boost dc/dc converter 100 is designed to step up the input voltage to a higher output voltage. On the other hand, the control mechanism shown in FIG. 11 may be employed when the primary application of the buck-boost dc/dc converter 100 is designed to step down the input voltage to a lower output voltage. In comparison with the control mechanisms shown in FIG. 6 and FIG. 11, the control mechanism shown in FIG. 13 provides seamless transitions between different operation modes. The control mechanism shown in FIG. 13 can be easily implemented.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
 detecting an input voltage and an output voltage of a buck-boost converter, wherein the buck-boost converter comprises:
  a first high-side switch and a first low-side switch connected in series across an input capacitor;
  a second high-side switch and a second low-side switch connected in series across an output capacitor; and
  an inductor coupled between a common node of the first high-side switch and the first low-side switch, and a common node of the second high-side switch and the second low-side switch; and
 configuring the buck-boost converter such that:
  configuring the buck-boost converter to operate in a buck PWM mode when the input voltage is greater than a first predetermined threshold, in a boost PWM mode when the input voltage is less than a second predetermined threshold, and in a buck-boost PWM mode when the input voltage is between the second predetermined threshold and the first predetermined threshold, wherein the first predetermined threshold is greater than the second predetermined threshold, and the output voltage is between the first predetermined threshold and the second predetermined threshold;
  during the entire buck PWM mode, configuring the second low-side switch to operate at a fixed duty cycle mode and the first high-side switch to operate at the buck PWM mode, wherein during the fixed duty cycle mode, the second low-side switch performs an on/off operation at least once in each switching period; and during the boost PWM mode, configuring the second low-side switch to operate at the boost PWM mode and the first high-side switch to operate at a constant-on mode.

2. The method of claim 1, further comprising:
configuring the second low-side switch to operate at a minimum duty cycle mode when the input voltage is greater than the first predetermined threshold.

3. The method of claim 1, further comprising:
detecting the input voltage and the output voltage of the buck-boost converter by a controller; and
generating, by the controller, a plurality of gate drive signals for the first high-side switch, the first low-side switch, the second high-side switch and the second low-side switch.

4. The method of claim 1, further comprising:
configuring the second low-side switch to operate at a minimum duty cycle mode when the input voltage is greater than the first predetermined threshold, wherein a gate drive signal of the second low-side switch is sync with a gate drive signal of the first high-side switch when the second low-side switch operates at the minimum duty cycle mode.

5. The method of claim 1, further comprising:
configuring the second low-side switch to operate at a minimum duty cycle mode when the input voltage is greater than the first predetermined threshold, wherein a gate drive signal of the second low-side switch and a gate drive signal of the first high-side switch are out-of-phase signals when the second low-side switch operates at the minimum duty cycle mode.

6. The method of claim 5, wherein:
a 180-degree phase shift is placed between the gate drive signal of the second low-side switch and the gate drive signal of the first high-side switch.

7. The method of claim 1, further comprising:
configuring the second low-side switch to operate at a minimum duty cycle mode when the input voltage is greater than the first predetermined threshold, wherein:
a switching frequency of the first high-side switch is greater than a switching frequency of the second low-side switch when the second low-side switch operates at the minimum duty cycle mode; and
a gate drive signal of the second low-side switch is sync with a gate drive signal of the first high-side switch when the second low-side switch operates at the minimum duty cycle mode.

8. The method of claim 1, further comprising:
configuring the second low-side switch to operate at a minimum duty cycle mode when the input voltage is greater than the first predetermined threshold, wherein:
a switching frequency of the first high-side switch is greater than a switching frequency of the second low-side switch when the second low-side switch operates at the minimum duty cycle mode; and
a gate drive signal of the second low-side switch and a gate drive signal of the first high-side switch are out-of-phase signals when the second low-side switch operates at the minimum duty cycle mode.

9. A method comprising:
providing a power converter, wherein the power converter comprises:
a buck converter portion comprising a first high-side switch and a first low-side switch connected in series across an input capacitor;
a boost converter portion comprising a second high-side switch and a second low-side switch connected in series across an output capacitor; and
an inductor coupled between a common node of the first high-side switch and the first low-side switch, and a common node of the second high-side switch and the second low-side switch;
detecting an input voltage and an output voltage of the power converter; and
configuring the power converter such that the power converter operates in either a buck converter mode or a boost converter mode depending on different input and output voltages, and wherein in an entire buck converter mode or an entire boost converter mode, one portion of the power converter operates at a fixed duty cycle mode and the other portion of the power converter operates at a PWM mode, wherein:
the one portion of the power converter leaves the fixed duty cycle mode and enters the PWM mode when the input voltage is close to the output voltage and during the fixed duty cycle mode, the one portion of the power converter performs an on/off operation at least once in each switching period.

10. The method of claim 9, further comprising:
configuring the power converter such that the buck converter portion operates at a maximum duty cycle mode.

11. The method of claim 9, further comprising:
configuring the power converter such that the boost converter portion operates at a minimum duty cycle mode.

12. The method of claim 9, further comprising:
configuring the power converter such that:
the buck converter portion operates at a maximum duty cycle mode; and
the boost converter portion operates at a minimum duty cycle mode.

13. The method of claim 9, wherein:
the first high-side switch operates at a maximum duty cycle mode; and
the second low-side switch operates at a minimum duty cycle mode.

14. The method of claim 9, further comprising:
generating a plurality of gate drive signals for the first high-side switch and the second low-side switch, wherein at least one of the first high-side switch and the second low-side switch operates at the fixed duty cycle mode.

15. The method of claim 9, further comprising:
configuring the first high-side switch to operate at the PWM mode; and
configuring the second low-side switch to operate at a minimum duty cycle mode.

16. The method of claim 9, further comprising:
configuring the first high-side switch to operate at a maximum duty cycle mode; and
configuring the second low-side switch to operate at the PWM mode.

17. The method of claim 9, further comprising:
in response to an input voltage drop, configuring the boost converter portion such that the boost converter portion leaves a minimum duty cycle mode and enters the PWM mode.

18. The method of claim 9, further comprising:
in response to an input voltage increase, configuring the buck converter portion such that the buck converter portion leaves a maximum duty cycle mode and enters the PWM mode.

\* \* \* \* \*